United States Patent
Ozeki et al.

(10) Patent No.: US 6,734,938 B2
(45) Date of Patent: May 11, 2004

(54) LIQUID CRYSTAL DISPLAY ELEMENT

(75) Inventors: Masao Ozeki, Yokohama (JP); Heinz Haberzettl, Obertshausen (DE)

(73) Assignees: OPTREX Corporation, Tokyo (JP); OPTREX Europe GmbH, Banenhausen (DE)

( * ) Notice: Subject to any disclaimer, the term of this patent is extended or adjusted under 35 U.S.C. 154(b) by 21 days.

(21) Appl. No.: 10/283,197

(22) Filed: Oct. 30, 2002

(65) Prior Publication Data
US 2003/0107700 A1 Jun. 12, 2003

(30) Foreign Application Priority Data
Oct. 31, 2001 (JP) .......................... 2001-334981

(51) Int. Cl.$^7$ .......................................... G02F 1/1333
(52) U.S. Cl. ........................................... 349/138
(58) Field of Search ................... 349/113, 138

(56) References Cited

U.S. PATENT DOCUMENTS

| | | | | |
|---|---|---|---|---|
| 4,895,432 A | * | 1/1990 | Iwashita et al. | 349/138 |
| 5,500,750 A | * | 3/1996 | Kanbe et al. | 349/42 |
| 5,754,260 A | | 5/1998 | Ooi et al. | 349/10 |
| 5,805,252 A | * | 9/1998 | Shimada et al. | 349/113 |
| 5,986,738 A | * | 11/1999 | Tagusa et al. | 349/138 |
| 6,259,500 B1 | | 7/2001 | Kijima et al. | 349/113 |
| 6,476,890 B1 | * | 11/2002 | Funahata et al. | 349/113 |

FOREIGN PATENT DOCUMENTS

JP          62-14621 A  *  1/1987

OTHER PUBLICATIONS

Patent Abstracts of Japan, JP 2000–231109, Aug. 22, 2000.
Patent Abstracts of Japan, JP 1–150115, Jun. 13, 1989.
Patent Abstracts of Japan, JP 4–318518, Nov. 10, 1992.

* cited by examiner

*Primary Examiner*—Tarifur R. Chowdhury
(74) *Attorney, Agent, or Firm*—Oblon, Spivak, McClelland, Maier & Neustadt, P.C.

(57) ABSTRACT

The liquid crystal display element has a pair of supporting substrates 10, 20 each having a transparent electrode patterned in a predetermined shape and an insulation film 12 formed on at least one transparent electrode 11 at a side of liquid crystal wherein the insulation film is a film which provides a refractive index difference of not more than 0.15 with respect to the refractive index of the transparent electrode and has a film thickness distribution of at least ±500 Å in the area of a radius of 500 μm, whereby a phenomenon of ITO bone appearance can be avoided without causing an increase of manufacturing cost and a reduction of productivity, and both requirements of the improvement of non-coloration characteristics of white and black and avoidance of a phenomenon of ITO bone appearance are satisfied.

8 Claims, 4 Drawing Sheets

LIQUID CRYSTAL DISPLAY ELEMENT

The present invention relates to a liquid crystal display element. In more detail, it relates to a technique for avoiding a phenomenon occurred when a transparent electrode composed of ITO is observed in a reflecting state.

Generally, ITO (indium-tin-oxide) is used for a transparent electrode utilized in a liquid crystal display element, and an electrode pattern is formed by patterning a conductive ITO film. The refractive index of ITO is about 1.9 which is larger than the refractive index of about 1.5 of a glass substrate as a supporting substrate.

Accordingly, the presence or absence of ITO provides a different intensity of reflection when outside light enters into the display element. In this case, the transparent ITO-pattern becomes visible whereby the quality of display is deteriorated remarkably. This phenomenon is called "ITO bone appearance" which is also called "visible electrodes".

As a technique for avoiding the ITO bone appearance, there has been known to adjust optimally the refractive index and the thickness of the insulation film formed on ITO and the refractive index and the thickness of an aligning film, wherein the optimum condition can be obtained by theoretical calculation. Since the phenomenon of ITO bone appearance can be treated theoretically as the reflection of light with respect to a multilayer film having different refractive indices, it is possible to understand the characteristics according to calculation of the reflection of a generally used multilayer film. Further, it is confirmed that a calculation result coincides with an experimental result in general.

In many cases, a TN type liquid crystal wherein liquid crystal molecules are twisted 90° is used for a liquid crystal display. This TN type liquid crystal includes a type of liquid crystal display called MTN (modulated twisted nematic) which improves non-coloration characteristics of white and black. This type concerns a method for providing a distribution of gap for the liquid crystal layer.

As the method for providing a distribution of gap for the liquid crystal layer, there has been known a method for conducting a roughening treatment to a glass substrate to form a concave-convex portion. For example, when an etching treatment is conducted using HF (hydrogen fluoride), there is obtainable a concave-convex portion of a level in which the pitch of peak to peak is about 100 $\mu$m and the depth of peak to bottom is about 5.5 $\mu$m.

The method for forming a film on the concave-convex portion of the glass substrate is classified generally into a sputtering method using a drying process and a flexographic printing method or spin coating method which belongs to a solvent coating type. In the sputtering method as the former case, there are problems that a usable device is expensive; it takes much time to form the film, and material other than an inorganic material can not be used for the film although there is an advantage that a film thickness distribution does not substantially result in the film formed. Accordingly, the former case is unsuitable for practical use.

On the other hand, the flexographic printing method or spin coating method as the latter case is employed in many production processes because a usable device is inexpensive; it is possible to form the film in a shorter time, and an organic material can be used. However, it is known that the film formed has a film thickness distribution along the concave-convex portion.

As described above, it is possible to obtain the optimum film thickness of each structural element according to the theoretical calculation, whereby it is possible to avoid the ITO bone appearance. As a matter of fact, however, there was such disadvantageous as follows. When an insulation film was formed by using a solvent coating method on a concave-convex portion of the substrate of the above-mentioned MTN liquid crystal display type, the optimum film thickness could not be obtained unlike the result obtainable according to the theoretical calculation because a film thickness distribution took place along the concave-convex portion, whereby it was difficult to reduce the ITO bone appearance.

For the reason described above, it is not preferable to use the sputtering method although it provides a predetermined uniform film thickness.

The present invention, accordingly, aims at avoiding a phenomenon of ITO bone appearance without causing an increase of manufacturing cost and a reduction of productivity, and provides a liquid crystal display element of, in particular, a MTN liquid crystal display type, whereby both the improvement of non-coloration characteristics of white and black and the avoidance of the phenomenon of ITO bone appearance can be satisfied.

In order to solve the above-mentioned problems, the present invention provides a liquid crystal display element comprising a pair of supporting substrates each having a transparent electrode patterned in a predetermined shape and an insulation film formed on at least one transparent electrode at a side of liquid crystal, wherein the insulation film is a film which provides a refractive index difference of not more than 0.15 with respect to the refractive index of the transparent electrode and has a film thickness distribution of at least ±500 Å in the area of a radius of 500 $\mu$m.

In the above-mentioned present invention, it is preferable that a concave-convex portion is formed on the supporting substrate at a side where the transparent electrode is formed, so as to provide a film thickness distribution to the insulation film. Further, in order to solve the above-mentioned problems more efficiently, it is preferable that the depth of peak to bottom of the concave-convex portion is at least 3 $\mu$m.

In a liquid crystal display element of a type that the insulation film is not required, the aligning film should have the above-mentioned refractive index and film thickness distribution.

Figure 7:
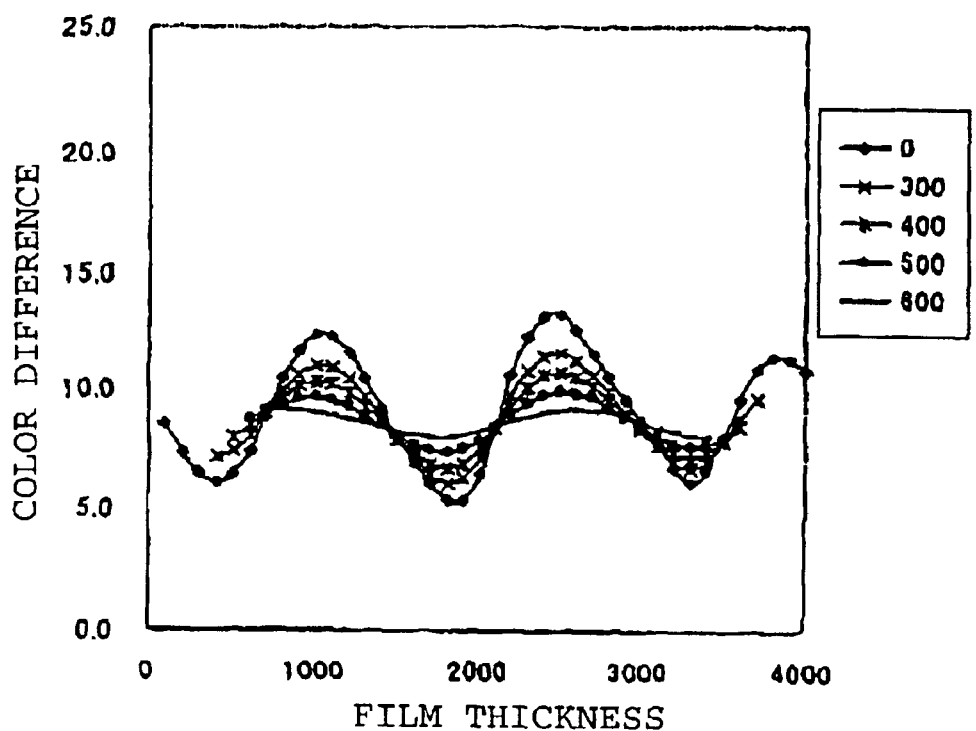
Figure 8:
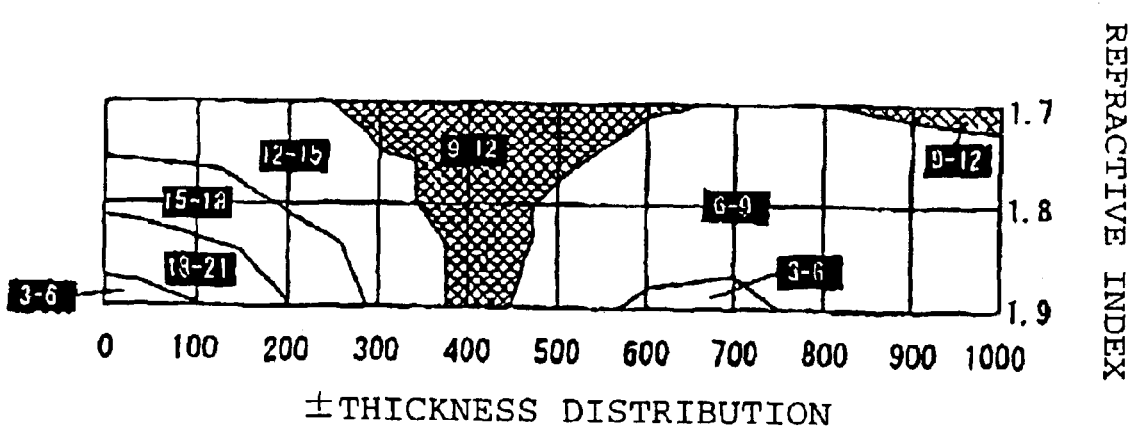

FIG. 7 is a graph showing the color difference obtained when the film thickness distribution of the insulation film is changed under the condition that the refractive index of the insulating film is 1.700; and FIG. 8 is a graph showing the color difference obtained when the film thickness distribution of the insulation film is changed under the condition that the refractive index of the insulating film is changed in a range of from 1.900 to 1.700.

First, explanation will be made as to how the phenomenon of ITO bone appearance occurs, and then, explanation will be made as to preferred embodiments of the present invention.

Figure 3:
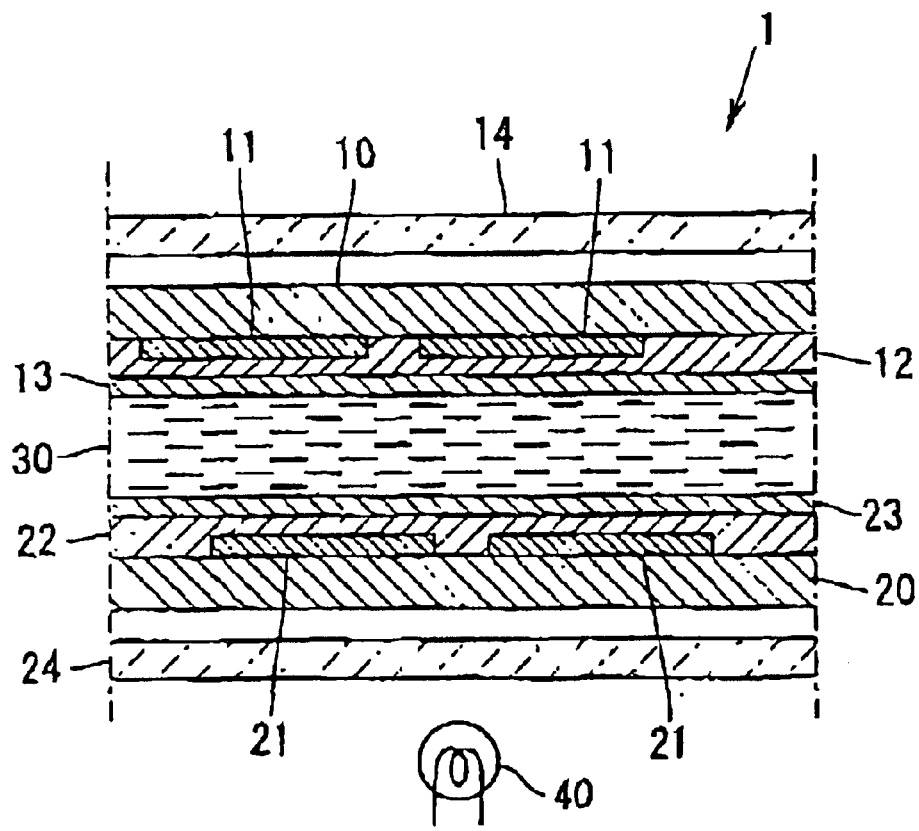
FIG. 3 is a diagrammatical cross-sectional view showing a typical conventional liquid crystal display element.

FIG. 3 shows a generally used liquid crystal display element wherein structural elements are shown in a separated state.

A liquid crystal display element 1 comprises a pair of supporting substrates, i.e., a transparent substrate 10 located at a display/observation plane side and a transparent substrate 20 at a rear plane side. Both transparent substrates 10, 20 are made of, for example, glass (which may be a synthetic resin), and transparent electrodes 11, 21 of ITO are formed at inner surface sides of the transparent substrates to oppose to each other, in predetermined electrode patterns.

On each of the transparent electrodes 11, 21, an aligning film 13 or 23 is formed by interposing an insulating film 12 or 22, and liquid crystal 30 such as TN is put between aligning films 13, 23. Silica films ($SiO_2$) as undercoat layers are formed under the transparent substrates 10, 20 at the sides where the transparent electrodes are formed, although they are not shown in drawing.

The liquid crystal element 1 exemplified therein is of a transparent type wherein polarizing films 14, 24 are provided on the transparent substrate 10, 20 at display/observation plane and rear plane sides. Further, a backlight 40 is disposed at a back side of the rear plane side transparent substrate 20.

In the structure described above, when outside light enters into the liquid crystal cell from the display/observation plane side, the outside light enters first from the polarizing film 14 disposed at an upper side. However, if there is a difference of refractive index between adjacent films, the light is reflected at the interface. If the display portion has the same condition as a whole, there takes place no problem because the light is reflected at the entire portion and there is no partial difference.

In fact, however, since the ITO film is patterned in order to obtain a predetermined display, the transparent electrode exists partly. Accordingly, there is a different reflection of outside light depending on the presence or absence of ITO. When such difference is large, "ITO bone appearance" wherein the pattern of ITO (transparent electrode) is visible, generates, and the quality of display is reduced remarkably.

For example, in a case that liquid crystal has a refractive index of 1.628, an aligning film has a refractive index of 1.700 and a thickness of 300 Å, ITO has a refractive index of 1.900 and a thickness of 450 Å, an undercoat layer ($SiO_2$) has a refractive index of 1.460 and a thickness of 300 Å, glass has a refractive index of 1.520, an insulation film has a refractive index of 1.900 and a thickness of 700 Å, and outside light is assumed as a C light source, the color difference of reflection light between a location where ITO exists and a location where ITO is absent, is about 7. Under the above-mentioned condition, the ITO bone appearance is more or less generated. The above-mentioned calculation result is obtainable in a case that light enters vertically and reflects vertically.

Figure 4:
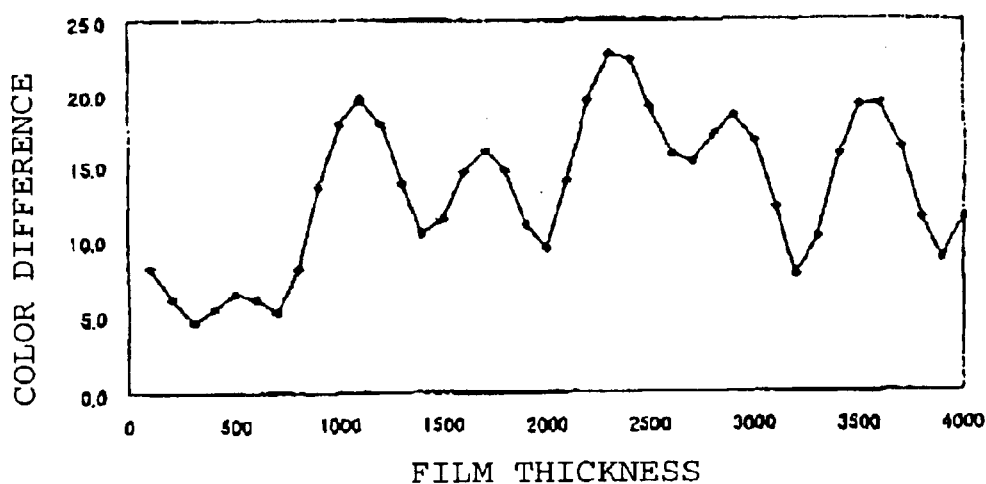
FIG. 4 is a graph showing the color difference obtained when the film thickness of the insulation film is changed under the condition that the refractive index of the insulating film is 1.900.

FIG. 4 shows the color difference obtained when the film thickness of the insulation film is changed under the condition that the refractive index of the insulation film is 1.900. It is understood that the color difference is small when the film thickness is in the vicinity of 500 Å. However, it is large in the range of the film thickness other than the above-mentioned.

Figure 5:
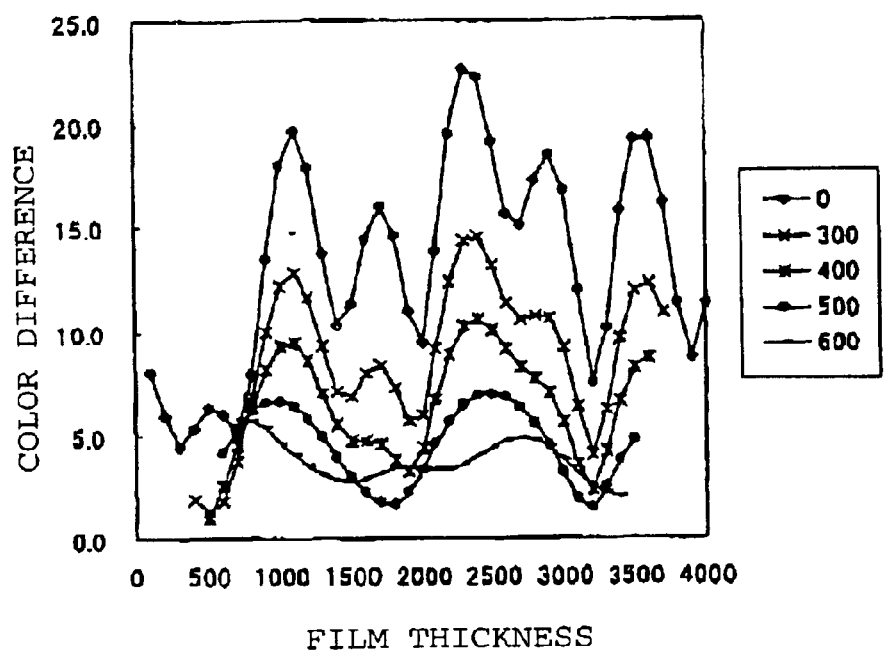
FIG. 5 is a graph showing the color difference obtained when the film thickness distribution of the insulation film is changed under the condition that the refractive index of the insulating film is 1.900.

FIG. 5 shows how the level of ITO bone appearance varies under the condition that there are film thickness distributions in the insulation film while the refractive index of the insulation film is kept to be 1.900. FIG. 5 shows the color difference in each case that the film thickness distribution is ±0 Å, ±300 Å, ±400 Å, ±500 Å or ±600 Å with respect to each center. For example, the film thickness distribution of ±300 Å means that the difference between the maximum film thickness and the minimum film thickness in the area of a radius of 500 μm is 600 Å.

According to a result as shown in FIG. 5, it is understood that the level of ITO bone appearance becomes smaller as the film thickness distribution becomes larger. It is understood that the film thickness distribution should be ±450 Å or more in order to obtain a color difference of 9 or less. Further, it is understood that the film thickness distribution should be ±600 Å in order to obtain a color difference of 6 or less.

Figure 6:
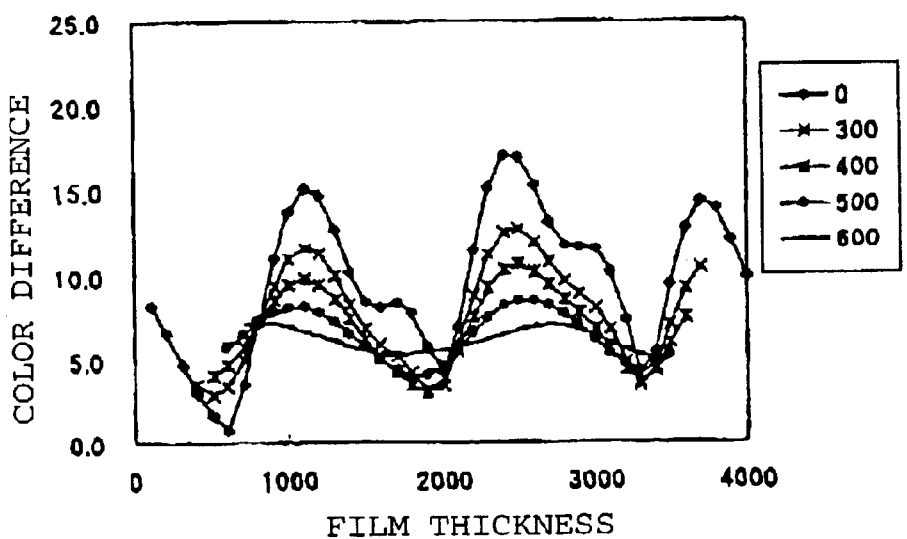
FIG. 6 is a graph showing the color difference obtained when the film thickness distribution of the insulation film is changed under the condition that the refractive index of the insulating film is 1.800.

FIG. 6 shows how the level of ITO bone appearance varies under the condition that there are film thickness distributions in the insulation film while the refractive index of the insulation film is kept to be 1.800, and FIG. 7 shows how the level of ITO bone appearance varies under the condition that there are film thickness distributions in the insulation film while the refractive index of the insulation film is kept to be 1.700.

In summarizing FIGS. 4 to 7, it is understood that although there are good points to reduce the color difference in each film thickness distribution, the color difference becomes larger when the center film thickness of the insulation film is changed or the film thickness distribution is changed. Namely, a large color difference causes the deterioration of ITO bone appearance level.

Accordingly, it is understood that an increase of film thickness distribution is necessary in order to keep a good level even though there is a change of the center film thickness and so on.

FIG. 8 shows the maximum values of color difference altogether when the refractive index of the insulation film is changed to 1.9–1.7 and the film thickness distribution is changed within a range of from 100 to 1,000 Å.

In view of FIG. 8, it is understood that the condition providing a color difference of not more than 9 is that the film thickness distribution of the insulation film is at least ±500 Å and the difference between the refractive index of the insulation film and the refractive index of the transparent electrode is not more than 0.15. It is said that the color difference which can not be discriminated by human eyes is 3 or less. In fact, however, a color difference of about 6 does not give strangeness. Accordingly, it is preferable to provide a color difference of 6 or less as a permissible range with respect to the ITO bone appearance. In order to obtain a color difference of 6 or less, the refractive index of the insulation film should be substantially equal to the refractive index of the transparent electrode and the film thickness distribution be in a range from ±600 Å to ±700 Å.

This reveals that when the film thickness distribution of the insulation film is at least ±500 Å and the difference between the refractive index of the insulation film and the refractive index of the transparent electrode is not more than 0.15, the level of ITO bone appearance is small even when there is the center in any film thickness.

In a case of a liquid crystal display element having no insulation film, an aligning film should provide a refractive index difference of not more than 0.15 with respect to the refractive index of ITO and the film thickness distribution should be ±500 Å.

Figure 1:
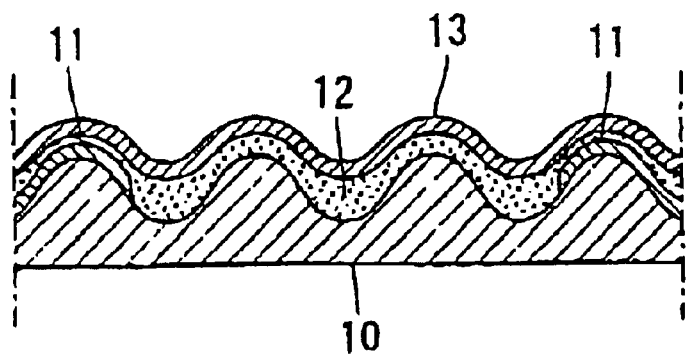
FIG. 1 is an enlarged cross-sectional view of a portion of a supporting substrate used in the liquid crystal display element of the present invention.

As the method for providing a film thickness distribution in the insulation layer, there is a method as shown in FIG. 1 as an Example. A concave-convex portion is formed in a glass substrate 10, and an insulation film 12 is coated on the glass substrate by a flexography printing followed by baking, whereby a peak portion of the film can be made thin and a bottom portion of the film can be made thick. When liquid for the insulation film is coated on the concave-convex portion, it follows so as to flatten peaks and bottoms of the concave-convex portion. When the glass substrate coated with the liquid for insulation film is baked in such state, an insulation film 12 having a film thickness distribution can be formed.

As the method for forming the concave-convex portion in the glass substrate, HF etching, sand blasting or the like is applicable. Further, a resin layer may be formed on a surface of the glass substrate, thereafter providing a concave-convex portion in the resin layer surface. In any method, it is necessary to reduce the pitch of the concave-convex portion so that the concave-convex portion can not be discriminated by human eyes.

Accordingly, the pitch of the concave-convex portion is preferably not more than 500 µm, more preferably, not more than 300 µm. The pitch of not more than 100 µm is almost not recognizable. Further, when the concave-convex portion is formed with a regularly repeated pattern, interference or moiré may be generated. Accordingly, it is preferable that the concave-convex portion is formed to have a random arrangement.

EXAMPLES

Figure 2:
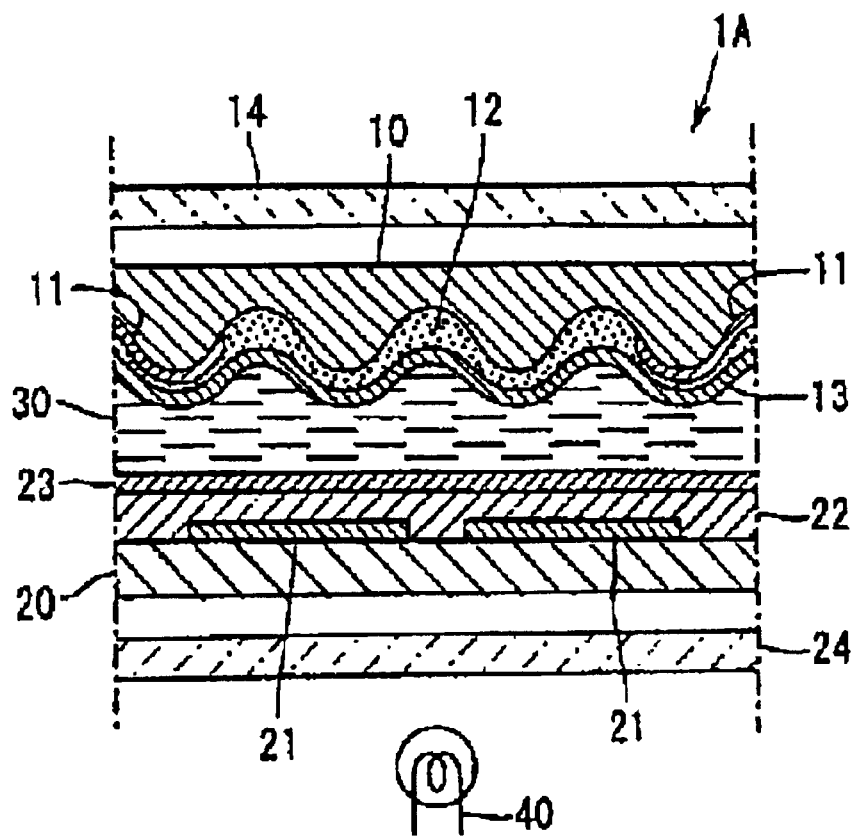
FIG. 2 is a diagrammatical cross-sectional view showing an embodiment of the liquid crystal display element of the present invention.

Explanation will be made as to a concrete Example of the liquid crystal display element 1A of the present invention with reference to FIG. 2. In FIG. 2, the same reference numerals designate the same or similar structural elements shown in FIG. 3 which has been explained before.

Glass substrates having a thickness of 1.1 mm were used for a transparent substrate 10 at a display/observation plane side and a transparent substrate 20 at a rear plane side. A roughening treatment was conducted by HF etching to an inner plane of the glass substrate 10 at a display/observation plane side to form a concave-convex portion wherein the pitch of peak to peak was about 100 µm and the depth of peak to bottom was about 5.5 µm.

On the concave-convex portion, $SiO_2$ was coated as an undercoat layer in a thickness of 300 Å. On the undercoat layer, a conductive ITO film was formed by sputtering in a thickness of about 300 Å followed by patterning, whereby a transparent electrode 11 having a predetermined shape was formed.

Liquid for the insulation film was coated by a flexography method on a plane including the transparent electrode 11. After preliminary drying, the liquid was baked at 300° C. to form an insulation film 12. The film thickness of the insulation film 12 was about 200 Å at a peak portion and about 3,000 Å at a bottom portion due to a concave-convex structure of the glass substrate 10, and a very large film thickness distribution was obtained. The insulation film 12 had an intermediate film thickness at an intermediate position between a peak and a bottom.

An aligning film 13 was formed on the insulation film 12 by a flexography printing method. The film thickness of the aligning film 13 was not affected much by the concave-convex portion of the glass substrate 10. The aligning film had a film thickness distribution of about 200 Å at a peak portion and about 400 Å at a bottom portion. A rubbing treatment was conducted to the aligning film 13 to provide an aligning function.

On the glass substrate 20 at an anti-display/observation plane side, $SiO_2$ was formed as an undercoat layer, without conducting a roughening treatment, in a thickness of 300 Å. On the undercoat layer, a conductive ITO film was formed by sputtering in a thickness of about 300 Å, followed by patterning, to form an opposing electrode 21. Then, an insulation film 22 was formed in a thickness of about 700 Å on a plane including the opposing electrode 21, and an aligning film 23 was formed successively in a thickness of about 300 Å. A rubbing treatment was conducted to the aligning film 23 to provide an aligning function.

The refractive index of each structural element to a wavelength of 590 nm is that ITO: about 1.941, insulation film: about 1.945, aligning film: about 1.746, glass substrate: about 1.520 and $SiO_2$: about 1.460. For the liquid crystal 30, such one having a refractive index of long axis of about 1.628 and a refractive index of short axis of about 1.498 was used.

Two glass substrates 10, 20 was laid one on the other by interposing in-plane spacers of 9.5 µm so that the direction of rubbing was crossed to each other, and the overlaid glass substrates were pressed by interposing a peripheral sealing material to thereby prepare a liquid crystal cell. Then, liquid crystal was injected into the cell through an inlet port by a vacuum injection method, and the inlet port was sealed with a sealing material. The liquid crystal layer was composed of 90° twisted TN having Δnd of about 1.6 µm.

Polarizing films 14, 24 are arranged at outer sides of the glass substrates 10, 20 respectively so that the long axis direction (the direction having a higher refractive index) of liquid crystal molecules adjacent to each other was the same as the absorption axis of the polarizing films. As the display mode, a negative mode (a normally black mode) providing black in the absence of a voltage was employed. Further, a backlight 40 was disposed at a back side of the glass substrate 20 at a rear plane side.

In observing the display by introducing outside light, the ITO bone appearance was almost not recognizable.

As Comparative Example, a liquid crystal cell was prepared in the same manner as the above-mentioned Example except that the refractive index of the insulation film was about 1.754. In observing the display, the ITO bone appearance was recognized. Further, even in a case that the refractive index of the insulation film was about 1.945 provided that the film thickness distribution was about ±100 Å, the ITO bone appearance was observed.

As described above, in accordance with the present invention, a liquid crystal display element comprising a pair of supporting substrates each having a transparent electrode patterned in a predetermined shape and an insulation film formed on at least one transparent electrode at a side of liquid crystal, wherein the insulation film is a film which provides a refractive index difference of not more than 0.15 with respect to the refractive index of the transparent electrode and has a film thickness distribution of at least ±500 Å in the area of a radius of 500 µm, is provided whereby the phenomenon of ITO bone appearance can be avoided without causing an increase of manufacturing cost and a reduction of productivity. Further, both requirements of the improvement of non-coloring characteristics of white and black and the avoidance of the phenomenon of ITO bone appearance can be satisfied.

In the embodiment as described above, a glass substrate having concave-convex portion is disposed at a display/observation plane side.

It is preferable that a glass substrate having concave-convex portion is disposed at an anti-display/observation plane side, too.

And it is preferable that dichroic dyes are included in the liquid crystal material.

The liquid crystal display element of the present invention provides a high functionality together with good visibility and power of expression when it is used for, in particular, a clock, indicator or the like for automobile use.

The entire disclosure of Japanese Patent Application No. 2001-334981 filed on Oct. 31, 2001 including specification, claims, drawings and summary is incorporated herein by reference in its entirety.

What is claimed is:

1. A liquid crystal display element comprising a pair of supporting substrates each having a transparent electrode patterned in a predetermined shape and an insulation film formed on at least one transparent electrode at a side of liquid crystal, wherein the insulation film is a film which provides a refractive index difference of not more than 0.15 with respect to the refractive index of the transparent electrode and has a film thickness distribution of at least ±500 Å in the area of a radius of 500 $\mu$m.

2. The liquid crystal display element according to claim 1, wherein a concave-convex portion is formed on the supporting substrate having the insulation film at a side where the transparent electrode is formed, so as to provide a film thickness distribution to the insulation film.

3. The liquid crystal display element according to claim 2, wherein the depth of peak to bottom of the concave-convex portion is at least 3 $\mu$m.

4. The liquid crystal display element according to claim 1, wherein an aligning film is formed instead of the insulation film.

5. The liquid crystal display element according to claim 1, wherein a concave-convex portion is formed on the supporting substrate having the insulation film at a display/observation plane side.

6. The liquid crystal display element according to claim 1, wherein a concave-convex portion is formed on the supporting substrate having the insulation film at an anti-display/observation plane side.

7. The liquid crystal display element according to claim 1, wherein a TN liquid crystal material is used.

8. The liquid crystal display element according to claim 7, wherein a dichroic dye is employed in the liquid crystal material.

* * * * *